(12) United States Patent
Vehra

(10) Patent No.: US 12,338,938 B2
(45) Date of Patent: Jun. 24, 2025

(54) OPERATING A PIPELINE INSPECTION GAUGE

(71) Applicant: Halliburton Energy Services, Inc., Houston, TX (US)

(72) Inventor: Imran Sharif Vehra, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 286 days.

(21) Appl. No.: 18/202,726

(22) Filed: May 26, 2023

(65) Prior Publication Data

US 2023/0383891 A1 Nov. 30, 2023

Related U.S. Application Data

(60) Provisional application No. 63/346,374, filed on May 27, 2022.

(51) Int. Cl.
*F16L 55/30* (2006.01)
*F16L 55/36* (2006.01)
*F16L 55/40* (2006.01)

(52) U.S. Cl.
CPC .............. *F16L 55/30* (2013.01); *F16L 55/40* (2013.01)

(58) Field of Classification Search
CPC . F16L 55/26; F16L 55/28; F16L 55/38; F16L 55/48; F16L 55/30; F16L 55/40; F16L 55/36; F16L 2101/30

(Continued)

(56) References Cited

U.S. PATENT DOCUMENTS 10,539,013 B2    1/2020    Vehra et al.
11,248,461 B2    2/2022    Vehra et al.
(Continued)

FOREIGN PATENT DOCUMENTS

CN    110307443    10/2019
EP    3242067    11/2017
(Continued)

OTHER PUBLICATIONS

International Search Report and Written Opinion for International Patent Application No. PCT/US2023/023736 dated Sep. 27, 2023.

*Primary Examiner* — Laura Martin
*Assistant Examiner* — Anthony W Megna Fuentes
(74) *Attorney, Agent, or Firm* — Thomas Rooney; C. Tumey Law Group PLLC

(57) ABSTRACT

A method and system for a pipeline inspection gauge. The method may include disposing a pipeline inspection gauge in a pipeline. The pipeline inspection gauge may comprise one or more modules attached to each other and an orifice. The pipeline inspection gauge may further include a generator disposed within at least one of the one or more modules, a turbine connected to the generator through a shaft, and at least four wheels connected to an outer surface of at least one of the one or more modules. The method may further include moving the pipeline inspection gauge using an at least partially opened orifice, wherein force from fluid flow in the pipeline is transferred through the orifice to the pipeline inspection gauge to create movement and creating a positive pressure pulse by closing the at least partially opened orifice.

19 Claims, 8 Drawing Sheets

(58) Field of Classification Search
USPC .......................................................... 73/865.8
See application file for complete search history.

(56) References Cited

U.S. PATENT DOCUMENTS

| | | |
|---|---|---|
| 11,401,783 B2 | 8/2022 | Vehra |
| 2011/0114119 A1 | 5/2011 | Yang et al. |
| 2017/0284591 A1 | 10/2017 | Soliman |
| 2023/0044672 A1 | 2/2023 | Vehra et al. |
| 2023/0094814 A1 | 3/2023 | Hayenga et al. |

FOREIGN PATENT DOCUMENTS

| | | | |
|---|---|---|---|
| WO | 8601751 | 3/1986 | |
| WO | WO-2022005866 A1 * | 1/2022 | .............. F16L 55/32 |

* cited by examiner

COAXIAL TX AND TILED RX ANTENNAS

COAXIAL TX AND ORTHOGONAL RX ANTENNAS

COAXIAL TX AND CO-LOCATED ORTHOGONAL
RX ANTENNAS RX ANTENNAS

COAXIAL TX AND CO-LOCATED ORTHOGONAL RX
ANTENNAS RX ANTENNAS AT DIFFERENT SPACINGS

COAXIAL TX AND TILED RX ANTENNAS RX
IN INCREMENTAL PLANS BY X DEGREES

COAXIAL AND TILED TX AND TILED RX ANTENNAS

OPERATING A PIPELINE INSPECTION GAUGE

CROSS-REFERENCED TO RELATED APPLICATIONS

The present application is a non-provisional of U.S. Patent Application No. 63/346,374, filed on May 27, 2022, the entire disclosure of which is incorporated herein by reference.

BACKGROUND

In the oil and gas industry, a tool known as a pipeline inspection gauge or "PIG" refers to any of a variety of movable inline inspection devices that are introduced into and conveyed (e.g., pumped, pushed, pulled, self-propelled, etc.) through a pipeline or a flow line. Pigs often serve various basic functions while traversing the pipeline, including cleaning the pipeline to ensure unobstructed fluid flow and separating different fluids flowing through the pipeline.

Modern PIGs, however, may be highly sophisticated instruments that include electronics and sensors employed to collect various forms of data during the trip through the pipeline. Such PIGs, often referred to as smart PIGs or inline inspection PIGs, may be configured to inspect the internals or interior of the pipeline, and capture and record specific geometric information relating to the sizing and positioning of the pipeline at any given point along the length thereof. Smart PIGs may also be configured to determine pipe wall thickness, pipe joint weld integrity, circumferential or longitudinal anomalies, cracks, corrosion, dents, and/or the like with the appropriate sensing equipment.

With the increase in sophistication of PIGs, an increase in power consumption reduced the PIGs' ability to take measurements over large areas. Additionally, measurements taken by PIG are captured on internal electronic. The measurements may not be withdrawn from the PIG until the PIG has been removed from the pipeline. Additionally, if a PIG gets stuck within a pipeline there currently does not exist a means of communication from the PIG that may be utilized to accurately identify where the PIG may be stuck.

BRIEF DESCRIPTION OF THE DRAWINGS

These drawings illustrate certain aspects of some examples of the present disclosure and should not be used to limit or define the disclosure.

DETAILED DESCRIPTION

Figure 1:
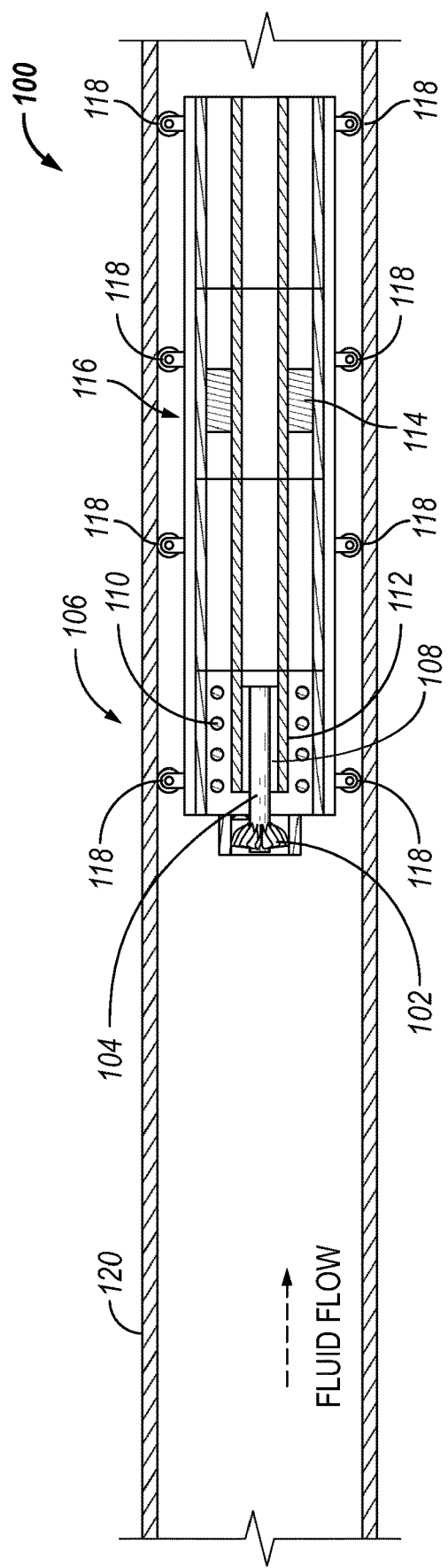
FIG. 1 illustrates a pipeline inspection gauge "PIG" disposed in a pipeline.

As discussed below, systems and methods for operating a pipeline inspection gauge or "PIG". Specifically, systems and methods may be directed to power generation, speed control, measurement operations, and communication between the PIG and personnel. A pipe PIG is a vessel that travels along the bore of a pipeline, such as an oil pipeline or gas pipeline. Pipe pigs are often propelled along the pipeline by fluid (e.g., oil, gas, and/or the like) flowing within the pipeline. So-called inspection pipe PIGS often comprise one or more sensors for collecting data about the pipeline as the pipe PIG travels along the pipe and may be used to inspect the condition of the pipe walls.

Inspection PIGS may be long, heavy, and expensive pieces of apparatus that utilize a specialist launching station for inserting the PIG into the pipeline and a specialist receiving station for retrieving the PIG from the pipeline. As such, the preparation, travel, and retrieval of an inspection pipe pig through a pipeline is an expensive, time-consuming, and disruptive process. Furthermore, inspection PIGS are known for being liable to get stuck within a pipeline and this often results in the pipeline being shut down until the stuck inspection PIG is removed. For certain pipelines (e.g., oil pipelines), any shutdown may be significantly costly. Inspection PIGS are often sized for a specific diameter pipeline and have limited ability in negotiating bends in the pipeline or moving between areas of the pipeline with differing diameters. Therefore, a given inspection PIG may only be used with pipelines having a suitable specification and multiple inspection PIGS may be utilized for inspection of wider ranges of pipelines.

Other types of known pipe PIGS include utility PIGS which are used to clean pipes. A utility PIG may comprise a solid steel tubular body with polymeric discs extending radially therefrom that serve to cup against the pipeline fluid to propel the PIG along the pipe and further polymeric discs that serve to clear debris from the pipeline as the PIG travels along.

An inspection PIG, may also be referred to as a "smart PIG." This is due to the electronics that may be utilized for inspecting the pipeline. In examples, the electronics may be the main draw on electrical power within the PIG. Currently, most PIGS are powered by batteries, which may take up space and deplete quickly, depending on power consumption. Additionally, certain sensors that may utilize high power and energy for operation may not, feasible, operate on battery power, which may limit the types of sensors utilized by an inspection PIG. An inspection PIG may generally inspect a pipeline utilizing methods of inspection such as magnetic flux leakage (MFL) or ultrasound technology (UT) with large number of sensors such as hall effect sensors for MFL or ultrasonic sensors (piezo or EMAT) for UT to obtain a high-resolution image of pipe deformities 360 degrees around the pipe. The circumferential "image" is usually broken down to 128 bins to obtain the high resolution. The large number of sensors complicates the design of such apparatus, increases the cost, and reduces reliability. The MFL technology uses strong permanent magnets that impose safety concerns. The permanent magnets also impact the PIG movement within the pipe.

FIG. 1 illustrates an example of a PIG 100 disposed within pipeline 120. As illustrated, PIG 100 may be centered within pipeline 120 utilizing any number of wheels 118, which may support PIG 100 within pipeline 120. As discussed below, wheels 118 may be utilized to help propel PIG 100 within pipeline 120 as well as generation power. During operations, PIG 100 may consume power in order to operate sensors and/or other electrical systems to take measurements of pipeline 120. A power generation system may be disposed within PIG 100 in order to provide power to PIG 100 as PIG 100 is not connected to an external source of power while disposed within pipeline 120. Power may be produced in a number of ways within PIG 100. For example, in one embodiment, the power generation system may comprise a generator 106 connected to a turbine 102. In examples, generator 106 may be a DC motor, a brushless DC motor (BLDC), or a permanent magnet synchronous motor (PMSM). This may allow generator 106 to both generate power and also perform as a motor to propel PIG 100 in pipeline 120, as discussed below. As illustrated, generator 106 may be disposed within at least one module of PIG 100. Turbine 102 may be an impeller and/or the like that may turn shaft 104 to produce electricity in generator 106. Turbine 102 may turn due to flow of fluid and/or gas across turbine 102. In examples, generator 106 may comprise a plurality of bearings 108, one or more coils 110, and/or a rotor 112. There may be any number of configurations and types of generators 106 that may be utilized with turbine 102 to generate electricity. The electricity may be used to power electronics 114, rechargeable batteries, and/or equipment within PIG 100. As illustrated, electronics 114 may be disposed in a module 116 that may be separate from a module that may house generator 106 as part of PIG 100. In examples, electronics 114 may be microcontrollers, memory devices, sensors, measurement devices, and/or the like. During operations, electronics 114 may be utilized to control the speed of PIG 100 moving through pipeline 120 as well as controlling measurements taken during measurement operations.

Figure 2A:
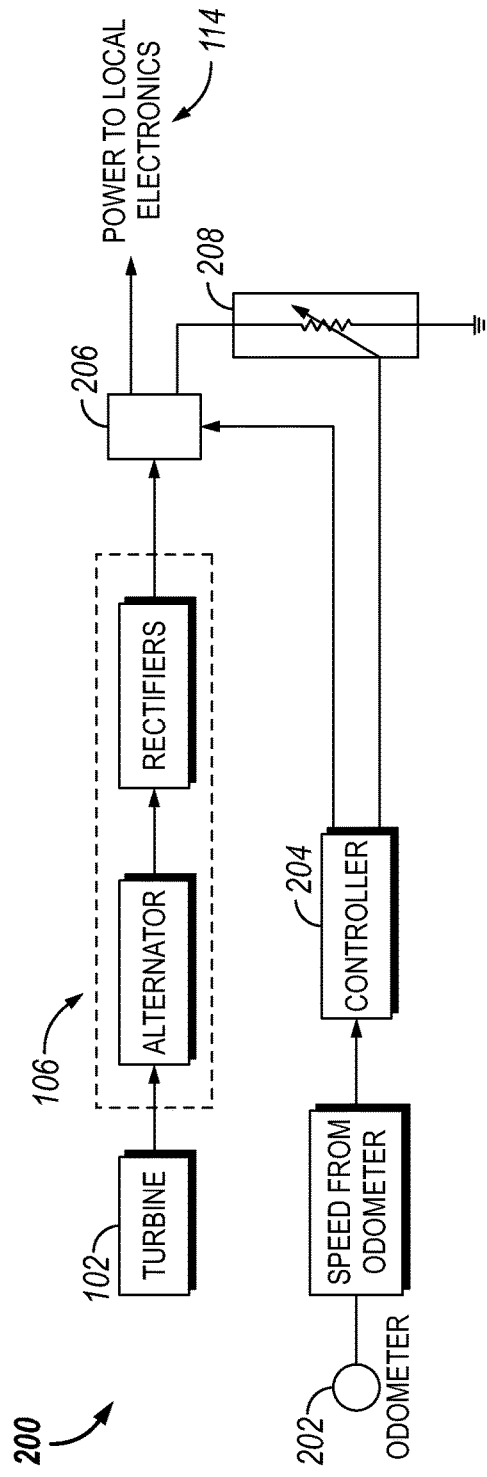
FIG. 2A illustrates a control circuit that may be utilized to control the speed at which PIG moves within pipeline.

FIG. 2A illustrates a control circuit 200 that may be utilized to control the speed at which PIG 100 moves within pipeline 120 (e.g., referring to FIG. 1) as well as generate power for PIG 100. As illustrated, control circuit 200 may comprise a number of electrically connected devices. For example, control circuit 200 may include an odometer 202, which may be connected to at least one wheel 118 to determine the lateral movement of PIG 100 within pipeline 120. The lateral movement may be sent as input to controller 204. Controller 204 may be connected to a switch 206 and a variable load 208 for power dissipation. Variable load 208 may be utilized to regulate lateral movement of PIG 100 in pipeline 120. For example, the higher the load in variable load 208 the more lateral movement PIG 100 may experience. A higher load may act as an electric brake, which may utilize reverse torque. The lighter the load, the less lateral movement of PIG 100. Controlling the load to variable load 208 may be performed by controller 204, which may regulate the adjustable load in variable load 208 and switch 206. Switch 206 may divert power from generator 106 to electronics 114 or variable load 208. Adjusting the power from electronics 114 to variable load 208 or vice versa may help in controlling the lateral movement of PIG 100 in pipeline 120. During operations, variable load 208 may only be used if the generator loading is needed beyond what the local electronics 114 and batteries (for recharging) may consume. As noted above in FIG. 1 and shown here in FIG. 2, generation of electricity may be performed by generator 106 that is connected to turbine 102. Additionally, generator 106 may comprise an alternator and a rectifier.

Figure 2B:
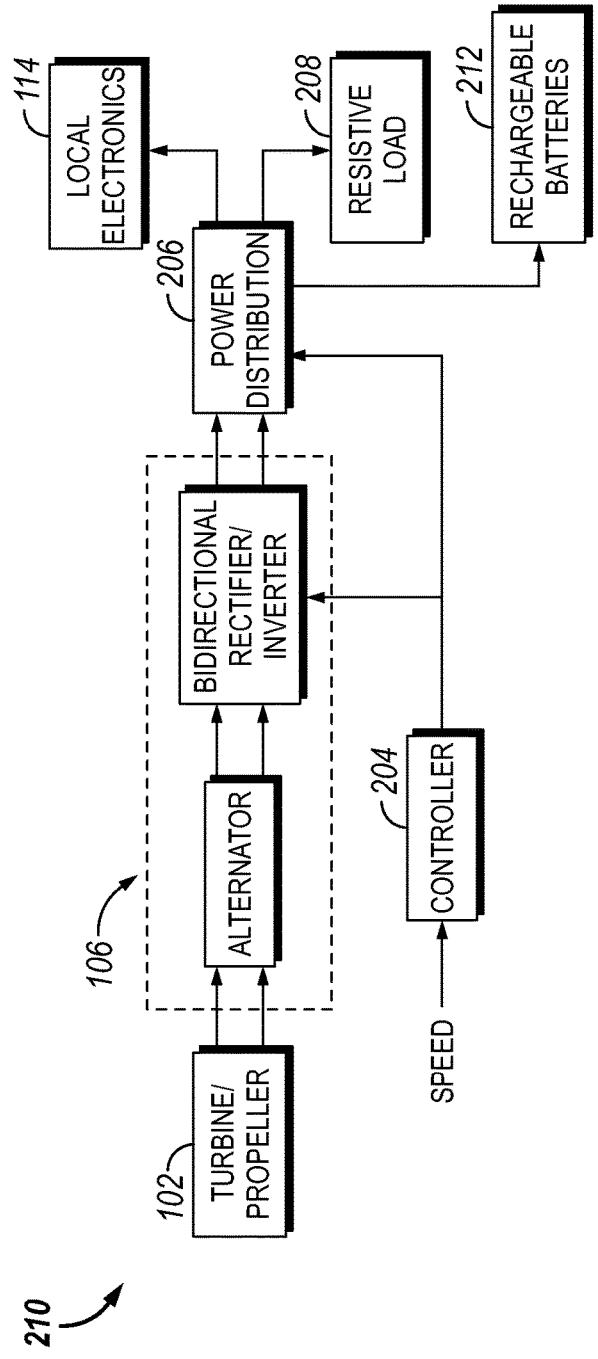
FIG. 2B illustrates another example of the control circuit.

FIG. 2B illustrates circuit 210 for a bidirectional turbine 102 (e.g., referring to FIG. 1) for power generation and propelling. In such an example, generator 106 may be a DC motor, a brushless DC motor (BLDC), or a permanent magnet synchronous motor (PMSM). This may allow generator 106 to both generate power and also perform as a motor to propel PIG 100 in pipeline 120, as discussed below. Additionally, electronics 114 may be bi-directional, to allow for the flow of power from generator 106 during power generation operation and for the flow of power to change and flow to generator 106 when generator 106 is operating as a motor to propel PIG 100 within pipeline 120. As illustrated, circuit 210 includes turbine 102 connected to a generator 106 and a controller 204 as described above. Controller 204 may also control switch 206, as described above, which may direct generated energy to flow to electronics 114, a variable load 208, and/or rechargeable batteries 212. Under normal operation, turbine 102 may spin a rotor that comprises windings. Magnets may be installed in stationary housing, discussed below in FIG. 3). Fluid and/or gas flowing through pipeline 120 pushes PIG 100 (e.g., referring to FIG. 1) down pipeline 120 and rotates turbine 102 that produces power. Controller 204 may achieve speed control by adjusting current pulled through the windings in generator 106, where generator 106 is a turbine drive generator. More current pulled through the windings results in higher torque on turbine 102. Therefore, PIG 100 may be pushed by the fluids and/or gas in pipeline 120 exerting a force on turbine 102. As turbine 102 is not free to rotate due to the increased torque at generator 106, the force exerted by fluids and/or gas may transfer through turbine 102 to the body of PIG 100 and move PIG 100 within pipeline 120 along the flow of fluid. Generally, the greater amount of torque, the more force is transferred through PIG 100 into movement. Likewise, reduction in speed may be achieved by reducing the electrical load by allowing turbine 102 to simply "free spin," which provides little resistance for fluid to exert a force upon. Thus, less force is transferred through PIG 100 into movement. Circuit 210 may also be utilized for other operations within PIG 100.

In examples, PIG 100 may become stuck in pipeline 120. In this situation, controller 204 may reverse the function of the rectifier in generator 106, which may allow generator 106 to operate as a motor driver. By reversing the direction of the current, the current being supplied by rechargeable batteries 212, allows for turbine 102 to rotate at high RPMs. As turbine 102 spins in an opposite direction as turbine 102 spins to generate power, turbine 102 may exert a force against the fluid within pipeline 120. This application of force thereby propels PIG 100. If enough force is exerted, PIG 100 may dislodge from being stuck in pipeline 120. In other examples, wheels 118 (e.g., referring to FIG. 1) may retract into housing of PIG 100 during propulsion exerted by turbine 102, which may allow for PIG to dislodge from pipeline 120. During these examples generator 106 may utilize power from rechargeable batteries 212 to rotate turbine 102 and propel PIG 100 through pipeline 120. After dislodging from pipeline 120, rechargeable batteries 212 may be recharged after PIG 100 utilizing the power generations methods discussed in this disclosure as discussed above. PIG 100 may further generate power with the utilization of a turbine 102.

Figure 3:
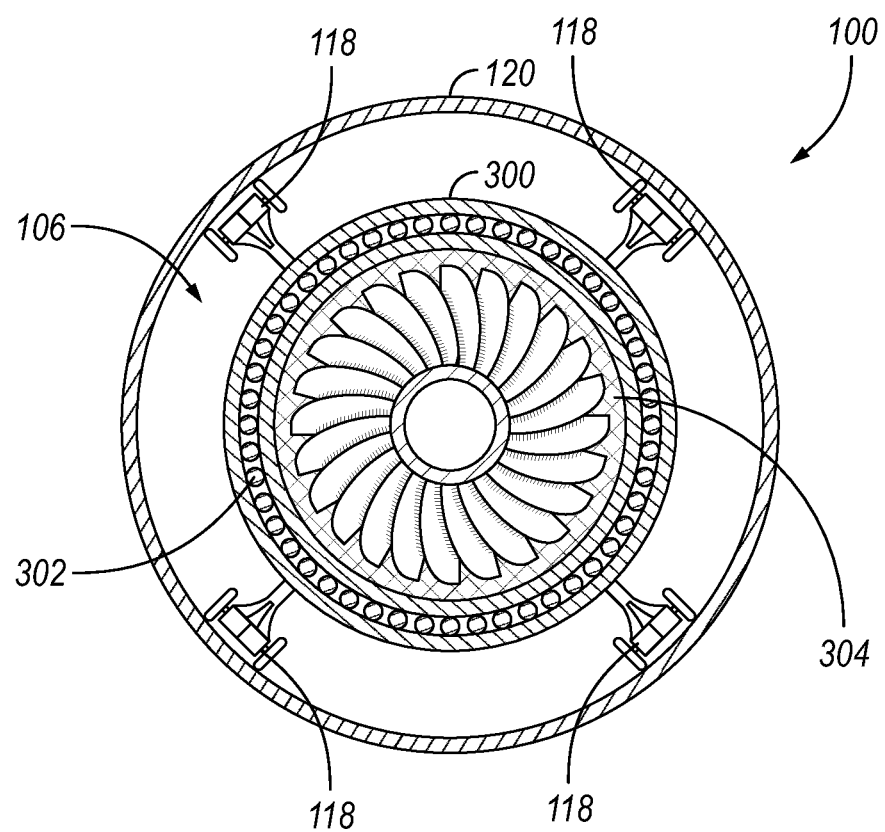
FIG. 3 illustrates an axial view down the pipeline.

FIG. 3 is an axial view down pipeline 120 of a rotation module 306. As illustrated PIG 100 is in contact with the inner surface of pipeline 120 by one or more wheels 118 that support and center PIG 100 within pipeline 120. In this view, PIG 100 may comprise an outer housing 300 that houses a plurality of bearings 302 that supports an inner housing 304. This may allow for outer housing 300 to rotate around inner housing 304 and for inner housing 304 may remain gyroscopically centered within pipeline 120. Within inner housing 304, equipment such as generator 106, electronics 114, sensors, and/or the like may be disposed. Inner housing 304 may provide a stable platform for equipment to perform any number of operations. Additionally, outer housing 300 may be allowed to rotate around inner housing 304 due to bearings 302. Disposed on the outer surface of outer housing 300 may be one or more wheels 118.

A plurality of wheels 118 may be positioned at any location about stationary housing 300. As illustrated, four wheels 118 may be equally spaced at 90-degree intervals around the circumference of outer housing 300. Likewise, if more than four wheels 118 are utilized, the spacing between the plurality of wheels 118 may ensure an even distribution of mechanical wear on wheels 118 as PIG 100 is jostled around by flow of fluid within pipeline 120. The number of wheels 118 positioned about stationary housing 300 may be, in some examples, greater or less than 4. For example, the number of wheels 118 may be an integer number between 3 and 50. The size of wheels 118 may vary inversely with the number of wheels, with a greater number of wheels 118 reducing the need for larger wheels. In other examples, wheels 118 may have non-uniform or irregular spacing. For example, wheels 118 may be characterized by any of random spacing, clustered spacing, graduated spacing, alternating spacing, and/or radial spacing. As mentioned, spacing of wheels may be help in the distribution of wear among wheels 118 as PIG 100 traverses pipeline 120.

In some examples, the distance from the center of PIG 100 to some or all of wheels 118 from a central axis of PIG 100 may be varied using a mechanism for translational actuation. For example, one or more of wheels 118 may be directly or indirectly coupled to one or more linear actuators (not shown) for modifying a position of wheels 118 relative to pipeline 120. Linear actuation may be achieved using, for example, hydraulic linear actuators, electric linear actuators, pneumatic linear actuators, electro-mechanical linear actuators, piezoelectric linear actuators, magnetic linear actuators, and/or shape memory alloy linear actuators. Linear actuation of wheels 118 may be in a linear direction normal to a tangential plane of an inner surface of pipeline 120. For example, one or more of wheels 118 may be linearly actuated out radially from a central axis of PIG 100. Linear actuation of wheels 118 may ensure good contact between wheels 118 and the inner surface of pipeline 120. This may also assist with maintaining control of velocity of PIG 100 through pipeline 120. In addition, linear actuation of wheels 118 may also assist with power generation by ensuring proper rotation of wheels 118.

Figure 4A:
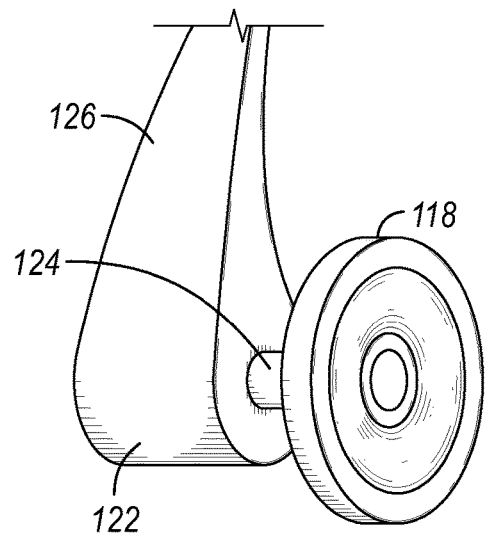
FIGS. 4A-4C illustrate examples of wheels used in conjunction with motors to generate power for the PIG.
Figure 4B:
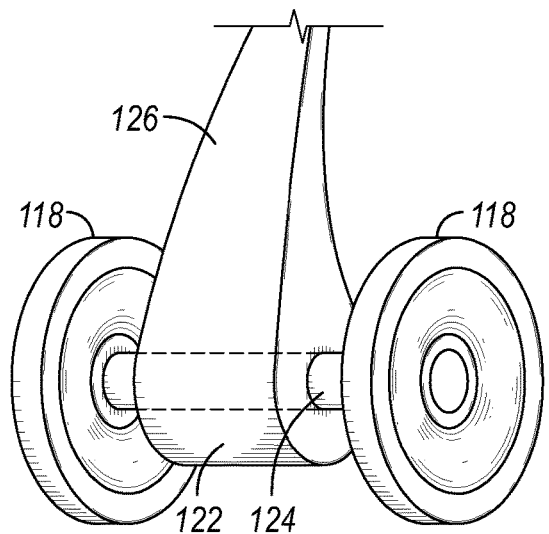
Figure 4C:
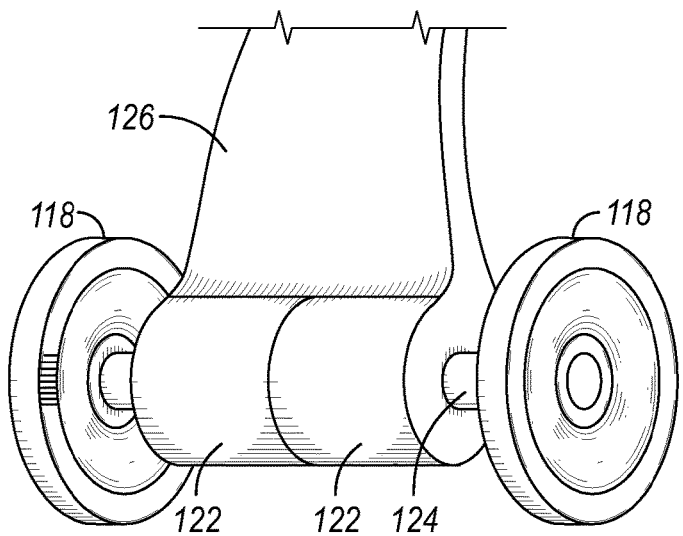

FIGS. 4A-4C illustrate examples of a wheel 118 generating power for PIG 100. In examples, wheels 118 may generate power for PIG 100 either in conjunction with generator 106 or separate and apart from generator 106. As illustrated, each wheel 118 may be connected to motor 122, which may act as a structural housing for wheel 118 to attach. Motors 122 may comprise a DC motor, such as a mini-DC motor, brushless DC motor (BLDC), or a permanent magnet synchronous motor (PMSM). When a DC motor is run in reverse, the armature of the motor becomes the functional equivalent of a rotor in an alternator, and the stator of the motor becomes the functional equivalent of an armature in the alternator. Rotation of an alternator's armature induces alternating voltage in the windings of its stator, thereby generating AC current. This AC current may then be converted to usable energy using a rectifier circuit (e.g., rectifier), which uses diodes to convert the AC current to pulsating DC current. Pulsating DC current may then be smoothed using a capacitor or an inductor to produce a stable DC voltage. Wheel 118 may attach to motor 124 via motor shaft 124 which extends into motor 122. Motor shaft 124 may impart rotational energy from motor 122 to wheel 118, thereby allowing PIG 100 to traverse pipeline 120 in a forward and/or backward direction, or to control velocity of PIG 100 as it traverses pipeline 120. Arm 126 may additionally comprise one or more linear actuators (not shown) for engaging an inner surface of pipeline 120 with wheel 118. Fluid flowing through pipeline 120 may, in some instances, impart kinetic energy to motor 122 in the form of AC current such as when motor 122 is run in reverse. Motor 122 may be electronically coupled to a rectifier for converting AC current to DC current. The rectifier may be electronically coupled to a rechargeable battery disposed within PIG 10.

In another example, a temporary anchor may be disposed at the end of arm 126 instead of wheel 118. A temporary anchor may comprise a contact surface having a high coefficient of friction. Where used, a plurality of temporary anchors circumferentially disposed about outer housing 300 (e.g., referring to FIG. 3) may temporarily anchor PIG 100 at a fixed position while traversing pipeline 120. Temporary anchoring of PIG 100 may be useful when, for example, a battery needs charging and/or a maximum fluid flow through turbine 102 is desired. In addition, temporary anchoring of PIG 100 in pipeline 120 may be achieved using one or more linear actuators, mentioned previously. Linear actuators may increase the length of arm 126 and allow contact surfaces to engage pipeline 120. Such anchoring may allow for a high pressure drop across PIG 100 and thus higher rates of current generation by a power generator 106 than when PIG 100 is moving with the flow of fluid in pipeline 120. Even higher rates of current generation may be achieved if PIG 100 is temporarily anchored and fluid flow through pipeline 120 restricted, such as by constricting an orifice or increasing a turbine load of turbine 102.

As illustrated in FIGS. 4B and 4C, one or more motors 122 may be coupled to one or more wheels 118. As PIG 100 (e.g., referring to FIG. 3) moves through pipeline 120 (e.g., referring to FIG. 3), as discussed above, wheels 118 may be run in a forward direction and/or in a reverse direction. Forward direction of a motor 122 may result in movement of PIG 100 along pipeline 120 in the direction of fluid flow or in a direction counter to fluid flow. Likewise, reversing the direction of motor 122 may result in power generation as PIG 100 converts kinetic energy from fluid flow to chemical potential energy in a battery. In some examples, various sets of wheels 118 may be singularly dedicated to motion and/or power generation. For example, a first set of wheels 118 may be dedicated to forward movement along pipeline 120, a second set of wheels 118 may be dedicated to backwards movement along pipeline 120, and a third set of wheels 118 may be dedicated to power generation. In other examples, all of wheels 118 may be dedicated to forward motion, backwards motion, or power generation. In another example, a switch may switch functionality of one or more motors between motor driver and power generator. In some examples, the rectifier may comprise a bidirectional rectifier. In each of these examples, linear actuation of wheels 118 may result in better contact with pipeline 120 or may eliminate contact with pipeline 120. For example, if it is desirable to engage only a first set of wheels for moving backwards within pipeline 120, a second set of wheels for moving forwards may be slightly retracted to disengage from pipeline 120. In still other examples, one or more wheels 118 may be connected to one or more generators 106 (e.g., referring to FIG. 3) through worm gear. As wheel 118 rotates, due to the movement of PIG 100 through pipeline 120 as discussed above, wheel 118 may rotate at least a part of generator 106 may rotate according to systems and methods above to produce power.

As mentioned, linear actuation of wheels 118 to engage pipeline 120 may assist with velocity control of PIG 100 through pipeline 120. In addition, or alternatively, velocity of PIG 100 through pipeline 120 may be controlled using reverse torque due to loading of an alternator. As mentioned, where motor 122 is run in reverse, it may act as an alternator and generate power. Electric braking of PIG 100 may be achieved by adjusting a resistive load of motor 122 that is directly connected to wheel 118, which causes motor 122 to act as an alternator. For example, electronics 114 may be equipped with a control system for varying the resistance of an adjustable load. Depending on a measured velocity of PIG 100 in pipeline 120 with respect to a setpoint velocity, electronics 114 may comprise internal circuitry capable of automatically switching between loads. In this way, velocity of PIG 100 may be continuously monitored and controlled. Internal circuitry for switching between loads may comprise or be electronically coupled to, in some examples, a proportional-integral-derivative (PID) controller.

In another example, wheel 118 may be substituted with a tread. Where used, a tread may provide good surface-to-surface contact with an inner surface of pipeline 120, thereby maintaining an effective seal between fluid flowing on either end of PIG 100 as PIG traverses pipeline 120. For example, a tread may comprise a grooved or non-grooved cylindrical surface with a continuous contact surface that conforms to the shape of an inner surface of pipeline 120, maintaining a gap between the cylinder and the pipe. In this manner, a pressure difference across PIG 100 may be maintained or created. In one or more examples, a tread may be used to generate power in much the same way as for wheels 118.

Referring back to FIG. 3, as noted above, within rotation module 306, bearings 302 may be disposed between inner housing 304 and outer housing 300. Bearings 302 may comprise ball bearings, roller bearings, thrust bearings, spherical bearings, needle bearings, tapered bearings, sleeve bearings, magnetic bearings, and/or fluid bearings. Alternatively, bearings 302 may comprise a track guide, track runner bearings, or running traces. Bearings 302 may enable inner housing 304 to stay level as PIG 100 is jostled or turned around within pipeline 120. Inner housing 304 may be weighted, such that a heavy side of inner housing 304 is permanently or semi-permanently biased by gravity downwards. Maintaining inner housing 304 constantly upright may be help in sensing and measurement operations as it may be desirable to keep one or more sensors 400, as illustrated in FIG. 5, disposed within PIG 100 in a relatively constant orientation relative to the direction of gravity.

Figure 5:
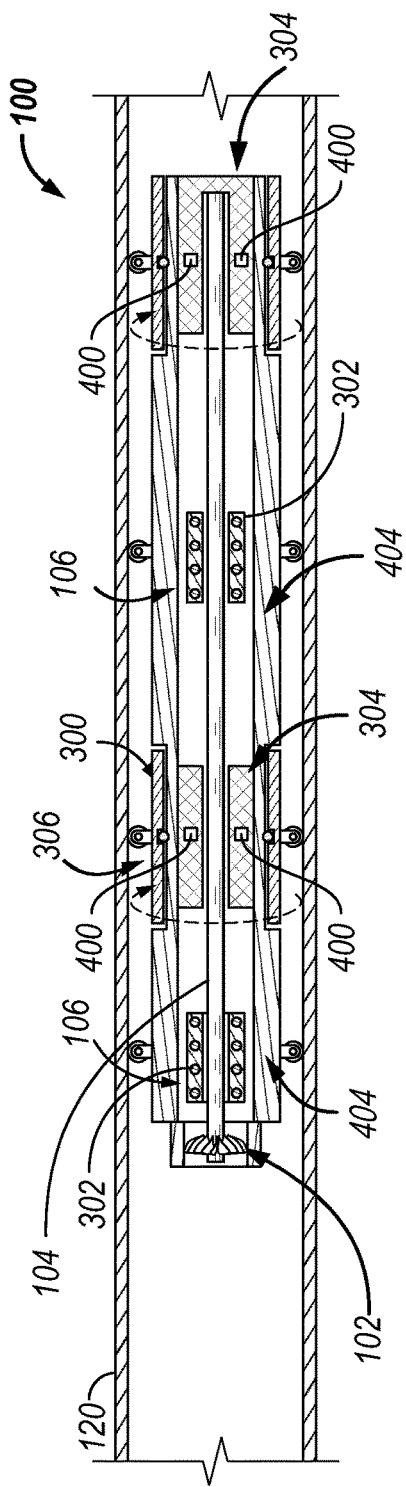
FIG. 5 illustrates the PIG with a plurality of rotation housings.

FIG. 5 further illustrates PIG 100 with a plurality of modules that may be stationary modules 404 or rotational modules 306. As illustrated, rotational modules 306 may rotate relative to stationary module 404. In examples, rotational modules 306 may house one or more sensors 400 for downhole operations. Sensors 400 may be imaging sensors, electromagnetic sensors, current sensors, hall sensors, electrodes, and/or the like. In examples, one or more sensors 400 may be disposed radially around inner housing 304. This may allow one or more sensors 400 to form a 360-degree view of pipeline 120 at one point within pipeline 120. As inner housing 304 is gyroscopically stabilized, sensors 400 may take measurements on a stable platform, which reduces errors in measurements. Additionally, as fewer sensors 400 may be needed, cross talk between sensors 400 may be greatly reduced due to the reduced number of sensors. Electronics 114 (i.e., referring to FIG. 1) may be connected to each of the one or more sensors 400 and may comprise gyroscopes and accelerometers. Gyroscopes and accelerometers may allow for the position of one or more sensors 400 to be known at any time during rotation of rotational modules 306.

In other examples, inner housing 304 may rotate and outer housing 300 may be stationary. In such example, inner housing 304 may be connected to shaft 104. As shaft 104 turns, inner housing 304 may likewise turn with shaft 104 turns. As noted above, shaft 104 turns as fluid moves across turbine 102. The movement of shaft 104 may also generate power in generator 106, as described above. Rotation of inner housing 304 may also rotate sensors 400. Thus, sensors 400 may take measurements of pipeline 120 and form a measurement that is 360 degrees at any measurement location within pipeline 120. During this measurement operation, only one, two, three, four, or one to four sensors 400 may be utilized, as a single sensor may be able to measure 360 degrees of pipeline 120. This would significantly reduce the number of sensors 400 needed to perform measurement operations. Forming an image of measurements taken by a sensor 400 that is rotating may be performed utilizing an information handling system, which may perform position binning on the measurements taken by each sensor 400. Position binning may be accomplished utilizing accelerometers, gyroscopes, magnetometers, and/or the like disposed in electronics 114 (e.g., referring to FIG. 1), inner housing 304, or elsewhere on PIG 100 to determine the position of each sensor 400 at any given time as sensor 400 rotates on inner housing 304.

Measurements from one or more sensors 400 may be stored within an information handling system, not illustrated, disposed on PIG 100 or transmitted back to a receiver in real time for review by personnel using telemetry. An information handling system may receive a digital telemetry signal, demodulate the signal, and display the tool data or well logs to a user. Information handling system may process the signals, and the information contained therein may be displayed for an operator to observe and stored for future processing and reference. Alternatively, signals may be processed downhole prior to receipt by display and storage unit or both, for example. In examples, the information handling system may utilize wireless communication with the telemetry system.

Software may govern the operation of the information handling system. A user, for example a technician, may interact with the information handling system (e.g., via software and one or more input devices thereon). A user may utilize the information handling system to employ action(s) by communicating appropriate commands to PIG 100 to execute those decisions. The information handling system may be operable to perform calculations or operations to evaluate the formation, identify formation boundary positions, and/or control the stroker actuator further described herein.

Figure 6:
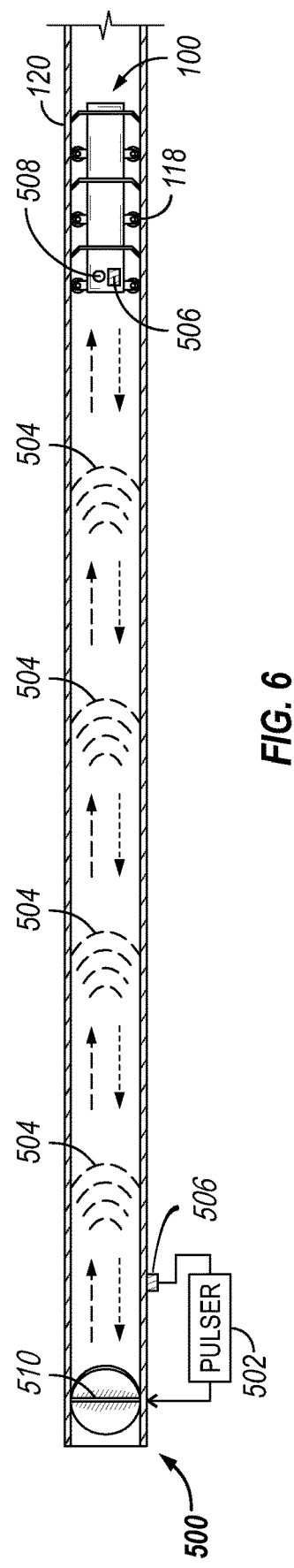
FIG. 6 illustrates a communication diagram between the PIG and a home location.

FIG. 6 illustrates communication/telemetry between PIG 100 and a home location 500. As illustrated, home location 500 may comprise a pulser 502 that may be connected to a valve 510 in pipeline 120. While a valve is discussed below for use in methods and systems of telemetry, valve 510 may be an actuator disposed within pipeline 120. In examples, pulser 502 may be an information handling system that controls the movement of valve 510. Controlling valve 510 may allow for the creation of a pressure pulse 504 that may be either positive or negative. For example, if valve 510 is closed, pressure within pipeline 120 may build, causing a pressure pulse 504 that is positive. Likewise, when valve 510 opens, the pressure within pipeline 120 may drop, creating a pressure pulse 504 that is negative. A pressure sensor 506, disposed on PIG 100, configured to sense and/or measure pressure within pipeline 120 may sense and/or measure one or more pressure pulses 504 originating from pulser 502. What is sensed by pressure sensor 506 may be sent to electronics 114 (e.g., referring to FIG. 1) to decode commands that may be sent to PIG 100 by personnel through pulser 502. For example, a pressure pulse 504 that is positive may be identified as a 1 and pressure pulse 504 that is negative may be identified as a 0, or vice versa. This may allow for instructions to be carried to PIG 100 in a digital format.

Likewise, PIG 100 may communicate and/or provide telemetry with home location 500 through any number of systems and/or methods. In examples, PIG 100 may communicate status of PIG 100 and/or the location of PIG 100 within pipeline 120. Creating a pulse (e.g., a pressure change) from PIG 100 is a difficult challenge to overcome as PIG 100 cannot block the flow of fluid within pipeline 120. This may prevent PIG 100 from creating a pressure pulse 504 that may be positive as PIG 100 cannot seal pipeline 120 to increase pressure and create a pressure pulse 504 that is positive. Likewise, PIG 100 cannot cause a pressure decrease and create a pressure pulse 504 that is negative. However, PIG 100 may be able to control the speed at with PIG 100 moves through pipeline 120.

By controlling the speed of PIG 100 through pipeline 120, a pressure differential may be created that acts as a pressure increase or decrease. For example, as PIG 100 moves through pipeline 120 at a constant speed, the fluid flow velocity remains at a constant. Upon command, internally instructed or externally instructed, PIG 100 may slow down within pipeline 120. This may slow fluid flow around PIG 100, increasing pressure in pipeline 120, resulting in a pressure drop across PIG 100. Likewise, if PIG 100 is instructed to increase speed, fluid flow may increase, reducing pressure in pipeline 120. By increase or decreasing the pressure at regular intervals, PIG 100 may simulate a "heartbeat." This "heartbeat" may allow for PIG 100 to be located during operations at any time in pipeline 120.

The increase or decrease in pressure within pipeline 120 may be measured by a pressure sensor 512 that is attached to pulser 502. In examples, pressure sensor 512 may be permanently or semi permanently disposed within pipeline 120. In other examples, pressure sensor 512 may be disposed on the external surface of pipeline 120, such as a fiber optic cable wrapped around pipeline 120. In all examples, pressure sensor 512 may be utilized to measure pressure increase or decrease within pipeline 120 created by PIG 100. Sensing pressure increase or decrease with pressure sensor 512, communications and/or telemetry from PIG 100 may be established. The pressure increase or decrease may be coded as a 0 or 1, or vice versa. The sensed pressure increases or decreases by pressure sensor 512 may be transmitted to pulser 502. Pulser 502 may then decode information from PIG 100, such as measurements in real time.

In other embodiments, increasing pressure or decreasing pressure within pipeline 120 for telemetry may be achieved by creating a pressure differential through turbine 102 (e.g., referring to FIG. 1). As discussed above, fluid flow within pipeline 120 may move turbine 102, which may generate electricity according to the systems and methods described above. To create a pressure differential through turbine 102, electric braking, discussed above, may be applied to wheels 118. Electric braking may slow PIG 100 within pipeline 120, which may create a pressure differential across turbine 102 as turbine 102 spins. To create a positive pressure pulse, turbine 102 may be spun backwards to increase pressure within pipeline 120. To create a negative pressure pulse, turbine 102 may be allowed to spin freely, which would not generate power.

Still further, an orifice 508 may be disposed on the exterior of at least one housing of PIG 100. In examples, orifice 508 may be added to a PIG 100 that may or may not have a turbine 102. Generally, orifice 508 may be at least partially closed during operations. As orifice 508 is at least partially closed, force applied to it from fluid movement may be transferred to PIG 100, allowing PIG 100 to move through pipeline 120. To increase or decrease fluid pressure, orifice 508 may be opened or closed. For example, closing orifice 508 completely from a semi-closed position may increase pressure and opening orifice 508 completely from a semi-closed position may decrease pressure. Orifice 508 may be used in examples in which PIG 100 may become lodged within pipeline 120 (e.g., referring to FIG. 1). When PIG 100 has become lodged, power generation may be prevented. However, PIG 100 may utilize stored power to operate orifice 508. This may allow PIG 100 to communicate the location of PIG 100 within pipeline 120 using the methods and systems described above. While telemetry may be utilized to relay position of PIG 100 to home location 500, other information, such as measurement may be transmitted from PIG 100 to home location 500 utilizing the systems and methods described above.

Figure 7:
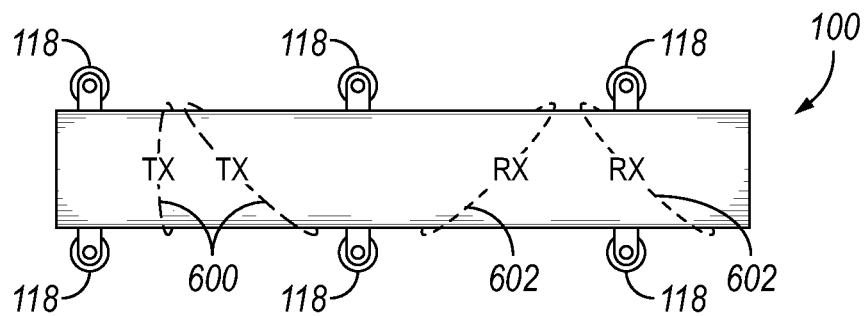
FIG. 7 illustrates antennas that may be utilized during measurement operations on the PIG.

FIG. 7 further illustrates antennas that may be utilized during measurement operations on PIG 100. As illustrated PIG 100 may be supported in pipeline 120 (e.g., referring to FIG. 1) by one or more wheels 118. PIG 100 may further comprise one or more transmitters 600 and one or more receivers 602. Current technology may utilize a plurality of sensors 400 (e.g., referring to FIG. 4) spread around the circumference of PIG 100 to create a circumferential "image." These may include hall effect or ultrasonic sensors. Using tilted antennas (i.e., transmitters 600 and receivers 602) provides circumferential or azimuthal inspection capability with a reduced number of sensors.

The system illustrated in FIG. 6 may utilize orthogonally placed tilted electromagnetic coil antennas that measure discontinuities in pipe wall conductivity. The antennas may tilt at 45 degrees to achieve directionality or circumferential sensitivity. A set of transmitters 600 and receivers 602 may be assembled at fixed distances. Transmitters 600 may be energized by continuous sinewave currents creating a magnetic field that gets induced into the walls of pipeline 120 (e.g., referring to FIG. 1). Alternatively, transmitters 600 may be driven by a square wave creating an impulse response. In this manner, wide band frequencies may be generated that broad band receivers 602 may receive. Thus, in a single firing multiple component frequency analysis may be performed. Thus, transmitters 600 may be fired using a continuous sine wave or a square wave for impulse response.

Receivers 602 may pick up secondary magnetic field because of the eddy currents induced in the pipe walls by transmitters 600. Various depths of investigation within the pipe thickness may be achieved by selecting appropriate frequency and spacing between transmitters 600 and receiver 602. With the ability to vary depth of investigation within the pipe walls detailed pipe features may be identified such as surface imperfections to cracks that may leak. Both transmitters 600 and receivers 602 may be tilted or just the receiver 602 may be tilted while transmitters 600 remain coaxial generating a uniform magnetic field. Furthermore, an array of receivers 602 may be assembled at varying distance from transmitters 600 and sampled simultaneously.

As transmitters 600 may be fired at the selected frequency. All receivers 602 may be sampled at the same time. The measured signal is processed in the embedded domain to obtain amplitude attenuation and phase shift between receivers 602. The amplitude and phase shift may also be measured between the transmittal current signal and each receiver 602. The amplitude attenuation and phase shift are treated independently.

To reduce the effect of direct transmitter magnetic field coupling into receivers 602, receiver coils may be equipped with bucking coils. Bucking coils may be wound in the same orientation as the corresponding receiver 602 but wound in the opposite direction. The number of turns is based on the degree of direct signal to be canceled.

Figure 8:
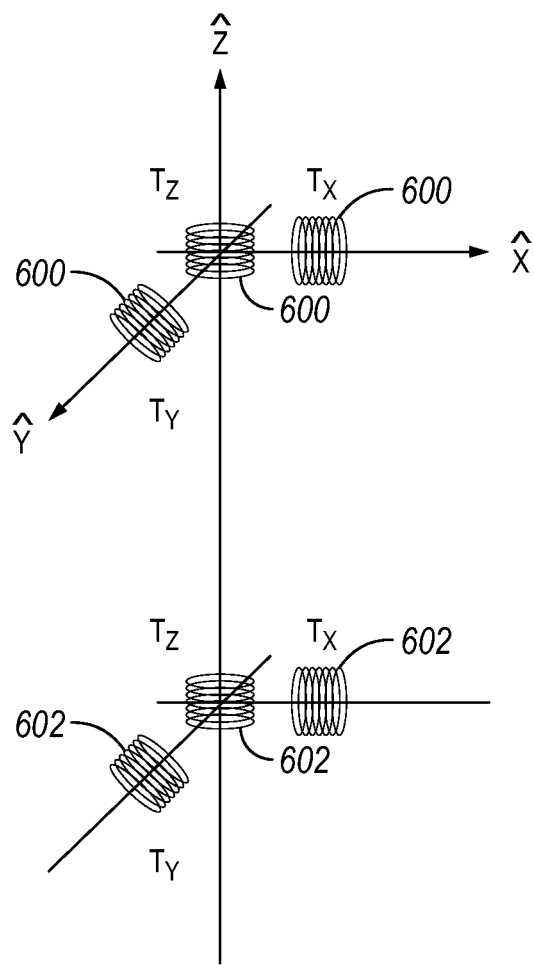
FIG. 8 illustrates transmitters and receivers disposed orthogonally on all axis of the PIG.

FIG. 8 illustrates that both transmitters 600 and receivers 602 may be orthogonally placed in all axes as shown below. The magnetic field response at the receivers 602 (with or without the presence of bucking receivers) for every possible transmitter/receiver combination may be expressed as a 3×3 matrix as shown below:

$$\overline{H} = \begin{bmatrix} H_{xx} & H_{xy} & H_{xz} \\ H_{yx} & H_{yy} & H_{yt} \\ H_{xx} & H_{zy} & H_{zz} \end{bmatrix} \quad (1)$$

In the matrix, the first component in the subscript denotes the transmitter direction and the second subscript denotes the receiver direction (i.e., $H_{xy}$ is the magnetic field received at the y-directed receiver due to an x-directed transmitter.) The orientations of transmitters 600 and receivers 602 may be selected to achieve a 360-degree image whether the tool is sliding or rotating.

Figure 9A:
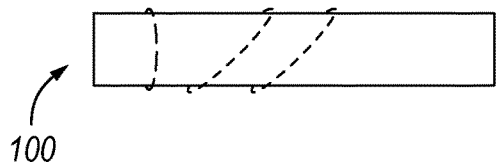
FIG. 9A illustrates a coaxial transmitter and tilted receiver.
Figure 9B:
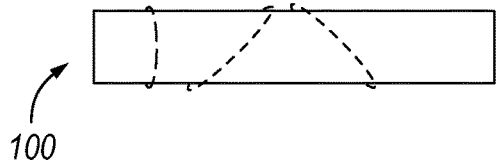
FIG. 9B illustrates a coaxial transmitter and orthogonal receiver.
Figure 9C:
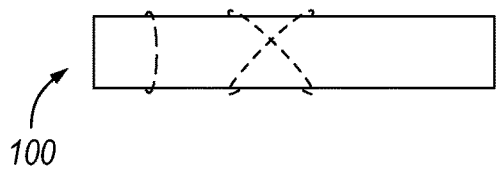
FIG. 9C illustrates a coaxial transmitter and a co-located orthogonal receiver.
Figure 9D:
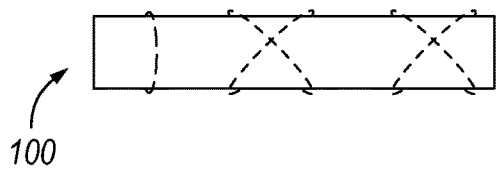
FIG. 9D illustrates a coaxial transmitter and a co-located orthogonal receiver at different spacings.
Figure 9E:
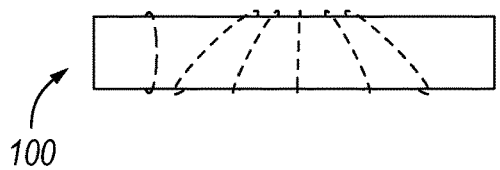
FIG. 9E illustrates a coaxial transmitter and a tilted receiver in incremental plans by a chosen degree.
Figure 9F:
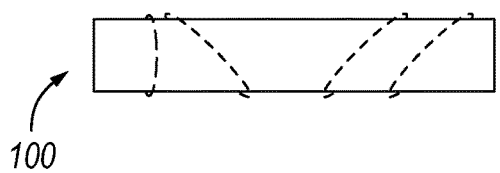
FIG. 9F illustrates a coaxial transmitter and tilted transmitter and tilted receiver.

FIGS. 9A-9C illustrate various configurations and orientations of transmitters 600 and receivers 602. The configurations and orientations are not limited to the above illustrations and can be of any permutations. Configurations and orientation may be set prior to a measurement operation. The configuration may determine the firing frequency or frequencies, based on the properties of the pipe diameter, wall thickness, pipe material and content fluid. The selection of frequencies and spacing may also be based on the features to be identified as the frequency selection and antenna spacing can identify pipe wall defects in varying degree of depth of investigation. Additionally, configurations may be crafted to work with advanced inversion algorithms for resistivity tools. Such algorithms may be tailored to determine pipe wall defects during operations.

After configuration and orientation have been set, PIG 100 (e.g., referring to FIG. 6) may be calibrated in air so that all scale and offset errors in gain and phase in antenna and/electronics response are nulled out. Further, the calibration may also be performed in a known good homogeneous pipe. The calibration coefficients may be stored to a non-erasable memory in the tool. During measurement operations, transmitters 600 (e.g., referring to FIG. 6) may be symmetrically placed on the opposite side of receivers 602 (e.g., referring to FIG. 6) in order to remove the non-linearities in antenna and electronics response as temperature and other environmental parameters may introduce errors in measurements. An alternative approach of "electrical compensation" may be to use a small in-situ common calibration signal that the measurement circuitry samples in real time and uses to null out the error. Using this method, the need for temperature calibration and correction coefficients or lookup table may be eliminated, as such calibration may be applied in-situ in real time.

Figure 10:
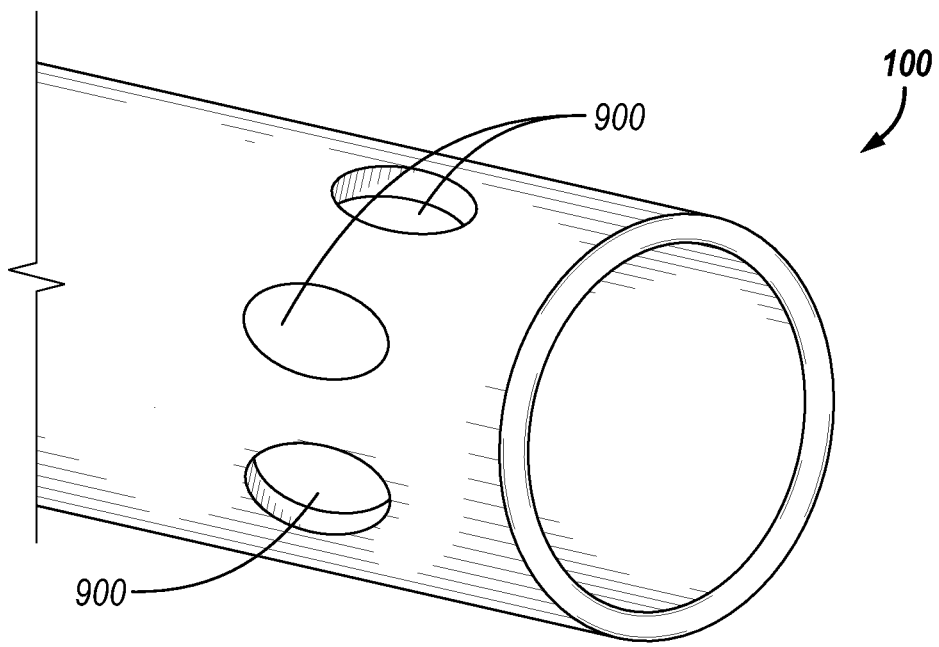
FIG. 10 illustrates a plurality of omnidirectional antennas disposed on the circumference of the PIG.

FIG. 10 illustrates an array of radial receivers 900 that may be mounted circumferentially in addition to axially mounted tilted antennas to PIG 100. Such omnidirectional radial receivers 900 distributed around the circumference may pick up circumferential anomalies.

The PIG described above, and its features are improvements over current technology. Improvements may be found in reduced complexity due to fewer number of sensors (antennas), improved reliability, improved quality due to improvement in crosstalk, shorter tool length which is a much sort after feature in the industry as it allows PIG movement through tighter bends, application of existing inversion algorithms used in resistivity tools, and depth of investigation within the pipe wall from surface imperfections to pipe leaks. Moreover, the systems and methods for describing a PIG and the operation of a PIG may comprise any of the various features of the systems and methods disclosed herein, comprising one or more of the following statements.

Statement 1: A pipeline inspection gauge may comprise one or more modules attached to each other, a generator disposed within at least one of the one or more modules, a turbine connected to the generator through a shaft, and at least four wheels connected to an outer surface of at least one of the one or more modules.

Statement 2: The pipeline inspection gauge of statement 1, wherein at least one of the one or more modules is a rotation module.

Statement 3: The pipeline inspection gauge of statement 2, wherein the rotation module comprises an outer housing and inner housing, and wherein a plurality of bearings are disposed between the outer housing and the inner housing.

Statement 4. The pipeline inspection gauge of statement 2, wherein at least one of the one or more modules is a stationary module.

Statement 5. The pipeline inspection gauge of statement 4, wherein the stationary module and the rotation module are connected to each other.

Statement 6. The pipeline inspection gauge of statements 1 or 2, further comprising one or more rectifiers operable to convert an AC current generated by the generator to a DC current.

Statement 7. The pipeline inspection gauge of statement 6, wherein the one or more rectifiers comprises a bidirectional rectifier.

Statement 8. The pipeline inspection gauge of statement 6, wherein the AC current generated by the generator is produced by a motor.

Statement 9. The pipeline inspection gauge of statements 1, 2 or 6, further comprising an orifice disposed on the one or more modules that is configured to be closed, to be opened, or to be at least partially open.

Statement 10. The pipeline inspection gauge of statements 1, 2, 6, or 9, further comprising a pressor sensor that is configured to measure pressure within a pipeline.

Statement 11. The pipeline inspection gauge of statements 1, 2, 6, 9, or 10, wherein at least one of the at least four wheels is connected to a motor and wherein the motor is connected to an arm that attaches the motor and the at least one of the at least four wheels to the outer surface of the at least one of the one or more modules.

Statement 12. A method may comprise disposing a pipeline inspection gauge in a pipeline. The pipeline inspection gauge may comprise one or more modules attached to each other, an orifice disposed on one of the one or more modules and is configured to be closed, to be opened, or to be at least partially open. The pipeline inspection gauge may further comprise a generator disposed within at least one of the one or more modules, a turbine connected to the generator through a shaft, and at least four wheels connected to an outer surface of at least one of the one or more modules. The method may further comprise moving the pipeline inspection gauge using an at least partially opened orifice, wherein force from fluid flow in the pipeline is transferred through the orifice to the pipeline inspection gauge to create movement and creating a positive pressure pulse by closing the at least partially opened orifice.

Statement 13. The method of statement 12, further comprising creating a negative pressure pulse by opening the at least partially opened orifice.

Statement 14. The method of statements 12 or 13, further comprising generating electricity by the generator as the turbine is turned by fluid flow within the pipeline.

Statement 15. The method of any previous statements 12-14, wherein at least one of the at least four wheels is connected to a motor and wherein the motor is connected to an arm that attaches the motor and the at least one of the at least four wheels to the outer surface of the at least one of the one or more modules.

Statement 16. The method of claim 15, further comprising generating energy when the at least one of the at least four wheels turns with the motor and the motor is configured as an alternator.

Statement 17. The method of any previous statements 12-15, further comprising creating a negative pressure pulse by allowing the turbine to spin freely.

Statement 18. The method of statement 17, further comprising creating a positive pressure pulse by reversing a rotation of the turbine.

Statement 19. The method of statements 12-15 or 17, wherein at least one of the one or more modules is a rotation module, wherein the rotation module comprises an outer housing and inner housing, wherein a plurality of bearings are disposed between the outer housing and the inner housing, and wherein one or more sensors are disposed on the inner housing.

Statement 20. The method of statement 19, further comprising taking one or more measurements with the one or more sensors as the inner housing rotates.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A pipeline inspection gauge comprising:
   one or more modules attached to each other;
   a generator disposed within at least one of the one or more modules;
   a turbine connected to the generator through a shaft; and
   at least four wheels connected to an outer surface of at least one of the one or more modules; and
   an orifice disposed on the one or more modules that is configured be closed, to be opened, or to be at least partially open, and wherein the orifice is configured to move the pipeline inspection gauge and create a positive pressure pulse.

2. The pipeline inspection gauge of claim 1, wherein at least one of the one or more modules is a rotation module.

3. The pipeline inspection gauge of claim 2, wherein the rotation module comprises an outer housing and inner housing, and wherein a plurality of bearings are disposed between the outer housing and the inner housing.

4. The pipeline inspection gauge of claim 2, wherein at least one of the one or more modules is a stationary module.

5. The pipeline inspection gauge of claim 4, wherein the stationary module and the rotation module are connected to each other.

6. The pipeline inspection gauge of claim 1, further comprising one or more rectifiers operable to convert an AC current generated by the generator to a DC current.

7. The pipeline inspection gauge of claim 6, wherein the one or more rectifiers comprises a bidirectional rectifier.

8. The pipeline inspection gauge of claim 6, wherein the AC current generated by the generator is produced by a motor.

9. The pipeline inspection gauge of claim 1, further comprising a pressure sensor that is configured to measure pressure within a pipeline.

10. The pipeline inspection gauge of claim 1, wherein at least one of the at least four wheels is connected to a motor and wherein the motor is connected to an arm that attaches the motor and the at least one of the at least four wheels to the outer surface of the at least one of the one or more modules.

11. A method comprising:
disposing a pipeline inspection gauge in a pipeline, the pipeline inspection gauge comprising:
one or more modules attached to each other;
an orifice disposed on one of the one or more modules and is configured to be closed, to be opened, or to be at least partially open;
a generator disposed within at least one of the one or more modules;
a turbine connected to the generator through a shaft; and
at least four wheels connected to an outer surface of at least one of the one or more modules;
moving the pipeline inspection gauge using an at least partially opened orifice, wherein force from fluid flow in the pipeline is transferred through the orifice to the pipeline inspection gauge to create movement; and
creating a positive pressure pulse by closing the at least partially opened orifice.

12. The method of claim 11, further comprising creating a negative pressure pulse by opening the at least partially opened orifice.

13. The method of claim 11, further comprising generating electricity by the generator as the turbine is turned by fluid flow within the pipeline.

14. The method of claim 11, wherein at least one of the at least four wheels is connected to a motor and wherein the motor is connected to an arm that attaches the motor and the at least one of the at least four wheels to the outer surface of the at least one of the one or more modules.

15. The method of claim 14, further comprising generating energy when the at least one of the at least four wheels turns with the motor and the motor is configured as an alternator.

16. The method of claim 11, further comprising creating a negative pressure pulse by allowing the turbine to spin freely.

17. The method of claim 16, further comprising creating a positive pressure pulse by reversing a rotation of the turbine.

18. The method of claim 11, wherein at least one of the one or more modules is a rotation module, wherein the rotation module comprises an outer housing and inner housing, wherein a plurality of bearings are disposed between the outer housing and the inner housing, and wherein one or more sensors are disposed on the inner housing.

19. The method of claim 18, further comprising taking one or more measurements with the one or more sensors as the inner housing rotates.

* * * * *